United States Patent
Struse et al.

(10) Patent No.: US 6,734,674 B1
(45) Date of Patent: May 11, 2004

(54) METHOD FOR LOCATING AND INSPECTING UNDERGROUND OR OTHER NON-VISIBLE NON-ELECTRICALLY CONDUCTIVE PIPES

(76) Inventors: Jared H. Struse, P.O. Box 728, Hereford, AZ (US) 85615; Daniel P. Struse, 5635 Wildrose Rd., Hereford, AZ (US) 85615

( * ) Notice: Subject to any disclaimer, the term of this patent is extended or adjusted under 35 U.S.C. 154(b) by 0 days.

(21) Appl. No.: 09/809,966

(22) Filed: Mar. 16, 2001

Related U.S. Application Data

(60) Provisional application No. 60/224,978, filed on Aug. 14, 2000.

(51) Int. Cl.⁷ .............................. G01V 3/10; G01R 27/08
(52) U.S. Cl. ......................................... 324/326; 324/693
(58) Field of Search ................. 324/326, 693, 324/559, 67, 637; 73/861.08, 861.11

(56) References Cited

U.S. PATENT DOCUMENTS

| | | | |
|---|---|---|---|
| 4,101,827 A | * | 7/1978 | Offner ........................ 324/326 |
| 4,740,757 A | * | 4/1988 | Converse et al. ............ 324/559 |
| 4,947,470 A | * | 8/1990 | Darilek ........................ 324/326 |
| RE34,701 E | | 8/1994 | Goodman |
| 5,337,002 A | | 8/1994 | Mercer |
| 5,354,521 A | | 10/1994 | Goodman |
| 5,585,725 A | | 12/1996 | Powell et al. |
| 5,633,589 A | | 5/1997 | Mercer |
| 5,963,042 A | * | 10/1999 | Suyama et al. ............. 324/326 |
| 5,990,682 A | | 11/1999 | Mercer |
| 5,990,683 A | | 11/1999 | Mercer |
| 5,990,690 A | * | 11/1999 | Suyama et al. ............. 324/639 |

FOREIGN PATENT DOCUMENTS

| | | |
|---|---|---|
| BE | 881807 | 6/1980 |
| DE | 2735344 | 2/1979 |

OTHER PUBLICATIONS

International Search Report, PCT/US02/07684, filed Mar. 15, 2002, entitled Method For Locating and Inspecting Underground or Other Non–Visible Non–Electrically Conductive Pipes, Jared Struse, et al., Inventors.

* cited by examiner

*Primary Examiner*—John Barlow
*Assistant Examiner*—Toan M. Le
(74) *Attorney, Agent, or Firm*—Birdwell & Janke, LLP

(57) ABSTRACT

A method for locating and inspecting underground or other nonvisible, non-electrically conductive pipes. An electrolyte is introduced into the pipe and a time varying electrical signal is applied to the fluid as in a standard prior art method for locating underground pipes, wherein proximity to the pipe is determined by assessing the strength of the electromagnetic field produced thereby. The method also provides for detecting leaks by introducing the electrolyte relatively slowly, to ensure that a pool of the electrolyte accumulates outside the pipe adjacent the leak.

21 Claims, 1 Drawing Sheet ously at the other end of the probe. The method is often
METHOD FOR LOCATING AND INSPECTING UNDERGROUND OR OTHER NON-VISIBLE NON-ELECTRICALLY CONDUCTIVE PIPES The present application claims the benefit of the inventor's provisional application Ser. No. 60/224,978, filed Aug. 14, 2000 incorporated by reference herein in its entirety.

BACKGROUND OF THE INVENTION

The present invention relates to a method for locating and inspecting underground or other nonvisible non-electrically conductive pipes, such as underground plastic pipes used for residential and commercial plumbing, and particularly for locating the pipes and for detecting leaks therein.

It is sometimes necessary to inspect damaged underground or other nonvisible pipes for leaks, or to determine the location of an undamaged pipe to prevent damage to the pipe by, e.g., excavation in the area of the pipe. A well known method for inspecting a buried pipe introduces a camera into and through the pipe at one end of a probe, the camera sending video to an operator operating the camera remotely at the other end of the probe. The method is often effective but still relatively expensive. Microphones may also be used to listen to the sound of fluid escaping through a damaged section of pipe, however, this method requires that the leak be large enough to make a discernible sound above the level of background noise, which can be considerable.

To locate or chart a length of buried or otherwise non-observable pipe that is either damaged or undamaged, a typical, standard method relies on the electrical conductivity of the pipe to carry an electrical signal that produces an electromagnetic field. A portable receiving device detects the resulting field and indicates its strength, which indicates proximity to the pipe and assists to locate it.

However, pipes used in plumbing such as water and sewer lines are often formed of an electrically nonconductive material such as PVC or ABS plastic. The standard method for locating these pipes does not work without providing, along the length of the pipe, an electrically conductive wire, or feeding an electrically conductive snake through the pipe and using the snake as the conductor. Though wires are often laid with plastic pipe, there are many existing plastic pipes for which this has not been done Moreover, to employ the electrically conductive snake generally requires cutting into the pipe in order to provide a point of entry for the snake, damaging the pipe. Snakes are also limited in reach, and the pipe may have to be unearthed down the line and cut again in order to reinstall the snake and continue inspecting or locating.

It may also be noted that the standard method is of no assistance in detecting leaks in the pipe, unless the damage to the pipe is so catastrophic that the pipe is separated into two spaced apart pieces, breaking the electrical connection.

Accordingly, there is a need for a method for locating and inspecting underground or other nonvisible non-electrically conductive pipes that provides for employing the standard method for locating such pipes, along the length of which electrically conductive materials have not been laid, at less cost and difficulty than provided by the prior art, and that may also be employed for leak detection.

SUMMARY OF THE INVENTION

The method for locating and inspecting underground or other nonvisible non-electrically conductive pipes solves the aforementioned problems and meets the aforementioned needs by introducing an electrically conductive fluid into the pipe, applying a time varying electrical signal to the fluid and employing the standard method for determining proximity to the pipe by assessing the strength of the electromagnetic field produced thereby.

The method also provides for detecting leaks by introducing the electrically conductive fluid at a sufficiently slow rate that a pool of the electrically conductive liquid accumulates outside the pipe adjacent the leak, and employing the standard method for determining proximity to the leak by assessing the strength of the electromagnetic field produced thereby.

Therefore, it is a principal object of the present invention to provide a novel and improved method for locating and inspecting underground or other nonvisible non-electrically conductive pipes.

It is another object of the present invention to provide a method for locating and inspecting underground or other nonvisible non-electrically conductive pipes that provides for employing the standard method for locating the pipes.

It is still another object of the present invention to provide a method for locating and inspecting underground or other nonvisible non-electrically conductive pipes that provides for employing the standard method at lower cost and with less difficulty.

It is yet another object of the present invention to provide a method for locating and inspecting underground or other nonvisible non-electrically conductive pipes that provides for leak detection by employing the standard method for locating underground or other nonvisible pipes.

The foregoing and other objects, features and advantages of the present invention will be more readily understood upon consideration of the following detailed description of the invention, taken in conjunction with the following drawings.

DETAILED DESCRIPTION OF A PREFERRED EMBODIMENT

Figure 1:
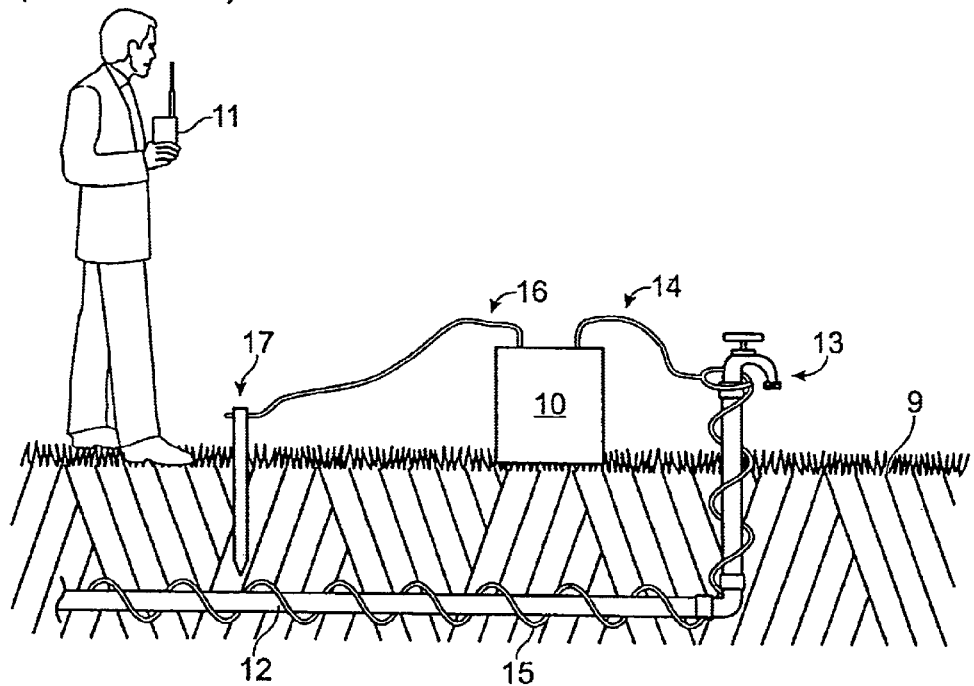
FIG. 1 is a pictorial view of a prior art, standard method for locating underground or other nonvisible pipes.

Referring to FIG. 1, a prior art, standard method for locating pipes under a ground surface 9 is illustrated. The method applies more generally to non-observable pipes; however, the pipe is typically non-observable because it is buried in the ground, wherein only an end of the pipe is accessible for inspection. Notwithstanding, the pipe may be hidden in or behind a wall or in or underneath a floor, and/or buried in concrete or some other substance that prevents direct visual inspection, and the method is equally applicable. The pipe may be any conduit for carrying liquid or gas, such as a water, natural gas or sewer line.

As is well known in the art, in this standard method, an electromagnetic signal transmitting device 10 and an electromagnetic signal receiving device 11 are employed for locating underground or other nonvisible metal pipes 12 or plastic pipes having a metal wire 15 buried therewith. The pipes have an associated conductive end 13 that is accessible or is made accessible by excavation. The end 13 may be the end of the pipe or the end of the wire. The transmitting device 10 has two leads, a signal lead 14 which is clamped or inductively coupled to the end 13 and a ground lead 16 which is connected to an earth ground 17. The transmitting device produces a time varying signal, typically in the range of 1–60 kilohertz, and couples the signal to the end 13, the signal being conducted along the length of the pipe or the wire. Depending on many variables, such as the length of the pipe, the conductivity of the earth, the proximity of the leads 14 and 16, and the frequency of the signal, the signal propagates along the pipe or w,ire as a result some combination of electromagnetic radiation, and electric coupling (direct current flows and capacitive coupling) and magnetic coupling between the pipe or wire and the ground lead 16.

Each of these means of propagation produce a field around the pipe that decreases with distance therefrom. The strength of the field is measured by the receiver 11. Using the receiver 11 and comparing the relative strength of the field (hereinafter "electromagnetic field") at different locations provides an indication that one is either closer to or further from the pipe or wire, thereby providing a means for locating the pipe or wire.

Figure 2:
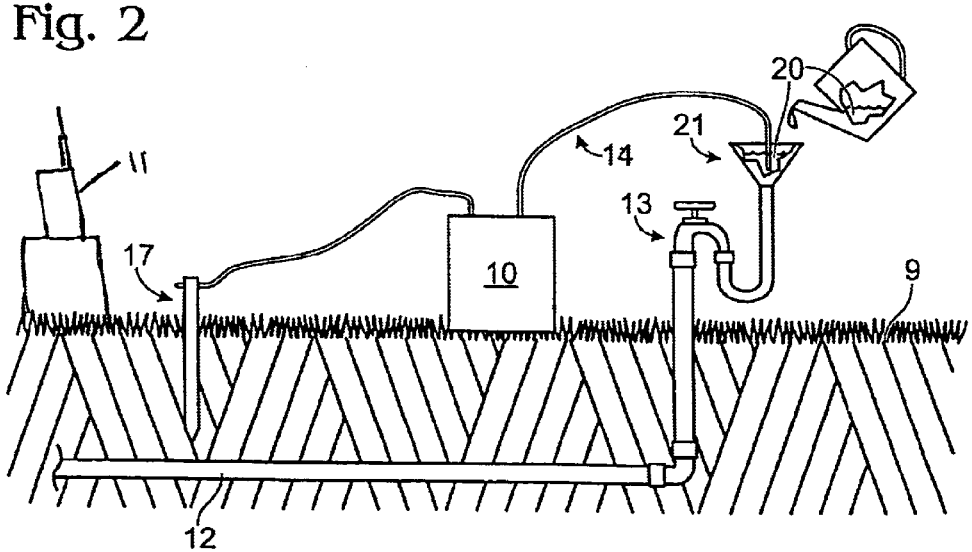
FIG. 2 is a pictorial view of an underground or other nonvisible non-electrically conductive pipe for which a method for locating and inspecting the pipe is employed according to the present invention.

Because the standard method requires conducting electrical current in a wire or pipe, it has not been usable for electrically non-conductive pipes such as plastic or ceramic pipes. However, the present invention provides a method for locating and inspecting underground or other nonvisible non-electrically conductive pipes making use of the standard method. Turning to FIG. 2, a flowable electrolyte 20, preferably either a potassium chloride or sodium chloride (saline) solution because these are non-toxic and easily rinsed, is introduced into the accessible end 13 of the pipe 12, typically a hose bib, by any available means, such as the funnel 21 shown in the Figure. The electrolyte must have a sufficient ionic disassociation to be conductive of the signal produced by the transmitter 10. It has been found that about four cups of table salt to about 5 gallons of water provides a more than sufficiently conductive electrolyte.

The lead 14 is electrically coupled to the solution 20 in the pipe 12, such as by being immersed therein as shown in FIG. 2, clamped to a metal fixture, e.g., a hose bib, that is in contact with the solution 20, or inductively coupled as in the standard method generally. The signal produced by the transmitter 10 propagates through the solution 20 in the pipe 12, producing a field like the field produced in the standard method generally. Moreover, it has been observed that the strength of the field measured by the receiver 11 is typically greater than that produced in the method according to the prior art.

Preferably, the pipe 12 is closed and the solution 20 is pumped into the pipe to fill and pressurize the pipe. However, filling or pressurizing the pipe are not necessary to practice the invention. All that is required is that the electrolyte in the pipe provide an electrically conductive path for current to flow, and this may require no more than a film or thin layer of the electrolyte in the pipe depending on the concentration of ions in the electrolyte. The pipe may be closed so that it will hold the electrolyte by a faucet or by a balloon as is known in the art.

For detecting and locating leaks, the electrolyte is introduced at a slow rate sufficient to accumulate a substantial amount of the electrolyte outside the pipe 12 proximate the leak. This pool of electrolyte in the vicinity of the leak increases the strength of the field at that location, so that the standard method may be used to locate it. This is a feature of the present invention that cannot be provided by the standard method as employed according to the prior art.

As mentioned, preferably, the electrolyte is a non-toxic solution, so that it may be used for potable water pipes. Regardless, after the pipe has been located or leaks therein have been detected or located, the electrolyte should be removed from the pipe in most cases. While the electrolyte may be drained, siphoned, expelled or vacuumed from the pipe as will be readily apparent, some residue will inevitably remain. Accordingly, preferably, the pipe is flushed with water. Further, to provide an indication of the end-point of such flushing, the electrolyte 20 is preferably mixed with a colored dye, so that observing the color of the effluent from the pipe provides an indication of when the electrolyte has been substantially removed from the pipe.

It is to be recognized that, while a particular method and apparatus for soil sterilization has been shown and described as preferred, other configurations and methods could be utilized, in addition to those already mentioned, without departing from the principles of the invention. In addition, though a preferred embodiment of the method has been described as making use of a standard method for locating underground or other nonvisible pipes, known variations of the standard method may also be employed where desired. For example, the method is not limited to the particular frequency ranges commonly employed in the standard method.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

What is claimed is:

1. A method for locating a non-electrically conductive pipe or a leak therein, comprising:
   introducing a flowable electrolyte into the pipe;
   causing a time-varying electrical signal to propagate through said electrolyte;
   detecting a resulting electromagnetic field at a plurality of locations outside the pipe; and
   comparing the relative strength of said electromagnetic field at said locations for locating the pipe or leak therein.

2. The method of claim 1, wherein said electrolyte consists essentially of a saline solution.

3. The method of claim 1, further comprising providing said electrolyte as a colored dye and after completion of said step of detecting, flushing said electrolyte through an observable opening in the pipe with a fluid such that said fluid mixes with the dyed electrolyte and the change in color of said fluid and said electrolyte exiting said observable opening indicates the amount of electrolyte removed from the pipe.

4. The method of claim 3, wherein said electrolyte consists essentially of a saline solution.

5. The method of claim 1, wherein said step of introducing said electrolyte into said pipe is over a time sufficient to accumulate an amount of said electrolyte outside the pipe proximate a leak therein sufficient to detectably increase the strength of said electromagnetic field at locations nearest said leak.

6. The method of claim 5, wherein said electrolyte consists essentially of a saline solution.

7. The method of claim 5, further comprising providing said electrolyte as a colored dye and after completion of said step of detecting, flushing said electrolyte through an observable opening in the pipe with a fluid such that said fluid mixes with the dyed electrolyte and the change in color of said fluid and said electrolyte exiting said observable opening indicates the amount of electrolyte removed from the pipe.

8. The method of claim 7, wherein said electrolyte consists essentially of a saline solution.

9. The method of claim 1, further comprising providing a first opening in the pipe, introducing said flowable electrolyte into the pipe through said opening, coupling a signal lead of an electrical signal transmitting device to said electrolyte, and transmitting said electrical signal through said signal lead to said electrolyte to produce said electromagnetic field.

10. The method of claim 1, wherein said electrical signal has a frequency of at least about 1 kHz.

11. The method of claim 3, wherein said electrical signal has a frequency of at least about 1 kHz.

12. The method of claim 5, wherein said electrical signal has a frequency of at least about 1 kHz.

13. The method of claim 7, wherein said electrical signal has a frequency of at least about 1 kHz.

14. The method of claim 8, wherein said electrical signal has a frequency of at least about 1 kHz.

15. The method of claim 9, wherein said electrical signal has a frequency of at least about 1 kHz.

16. The method of claim 3, further comprising providing a first opening in the pipe, introducing said flowable electrolyte into the pipe through said opening, coupling a signal lead of an electrical signal transmitting device to said electrolyte, and transmitting said electrical signal through said signal lead to said electrolyte to produce said electromagnetic field.

17. The method of claim 16, wherein said electrical signal has a frequency of at least about 1 kHz.

18. The method of claim 5, further comprising providing a first opening in the pipe, introducing said flowable electrolyte into the pipe through said opening, coupling a signal lead of an electrical signal transmitting device to said electrolyte, and transmitting said electrical signal through said signal lead to said electrolyte to produce said electromagnetic field.

19. The method of claim 18, wherein said electrical signal has a frequency of at least about 1 kHz.

20. The method of claim 7, further comprising providing a first opening in the pipe, introducing said flowable electrolyte into the pipe through said opening, coupling a signal lead of an electrical signal transmitting device to said electrolyte, and transmitting said electrical signal through said signal lead to said electrolyte to produce said electromagnetic field.

21. The method of claim 20, wherein said electrical signal has a frequency of at least 1 kHz.

* * * * *